US009432577B2

United States Patent
Yamada

(10) Patent No.: US 9,432,577 B2
(45) Date of Patent: Aug. 30, 2016

(54) IMAGE JOINING APPARATUS, IMAGE JOINING METHOD, AND IMAGE JOINING PROGRAM

(71) Applicant: JVC KENWOOD Corporation, Yokohama-shi, Kanagawa (JP)

(72) Inventor: Kunio Yamada, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/489,883

(22) Filed: Sep. 18, 2014

(65) Prior Publication Data

US 2015/0146041 A1    May 28, 2015

(30) Foreign Application Priority Data

Nov. 28, 2013  (JP) ................................. 2013-246558

(51) Int. Cl.
| | |
|---|---|
| *H04N 5/225* | (2006.01) |
| *H04N 5/232* | (2006.01) |
| *H04N 1/387* | (2006.01) |
| *H04N 5/262* | (2006.01) |

(52) U.S. Cl.
CPC ........ *H04N 5/23238* (2013.01); *H04N 1/3876* (2013.01)

(58) Field of Classification Search
CPC ............. H04N 5/23238; H04N 5/265; H04N 3/1593; G06T 2200/032; G03B 37/00; G06K 2009/2045
USPC ............................................. 348/218.1, 239
See application file for complete search history.

(56) References Cited

U.S. PATENT DOCUMENTS

| | | | | |
|---|---|---|---|---|
| 7,456,864 B2* | 11/2008 | Soga | ...................... | H04N 5/232 348/218.1 |
| 8,957,944 B2* | 2/2015 | Doepke | ...................... | 348/211.4 |
| 2009/0290013 A1* | 11/2009 | Hayashi | ................ | H04N 5/232 348/36 |
| 2010/0302347 A1* | 12/2010 | Shikata | .................. | H04N 5/232 348/36 |
| 2011/0043605 A1* | 2/2011 | Hwang | ...................... | G06T 1/00 348/36 |
| 2011/0096143 A1* | 4/2011 | Ono | ........................ | G03B 37/04 348/36 |
| 2011/0211038 A1* | 9/2011 | Noguchi | ................ | H04N 5/232 348/36 |
| 2013/0038680 A1* | 2/2013 | Mashiah | ............ | H04N 5/23238 348/36 |
| 2013/0329072 A1* | 12/2013 | Zhou | ..................... | G06T 3/4038 348/222.1 |
| 2014/0139621 A1 | 5/2014 | Shinozaki et al. | | |

FOREIGN PATENT DOCUMENTS

JP   2013-030875 A   2/2013

* cited by examiner

*Primary Examiner* — Kelly L Jerabek
(74) *Attorney, Agent, or Firm* — Procopio, Cory, Hargreaves & Savitch LLP

(57) ABSTRACT

Provided is an image joining apparatus that creates a joined image by joining multiple consecutive still images on a time axis, the image joining apparatus including: a past image confirmation unit that confirms whether there is a past still image located before the previous still image in terms of time in at least a part of a portion to be joined to the target still image; an angle calculation unit that calculates an angle formed between a motion vector associated with the target still image and a motion vector associated with the past still image, when the past image confirmation unit has confirmed that the past still image is present; and a stop processing unit that stops joining of the target still image when the angle calculated by the angle calculation unit is equal to or greater than a predetermined angle.

9 Claims, 9 Drawing Sheets

IMAGE JOINING APPARATUS, IMAGE JOINING METHOD, AND IMAGE JOINING PROGRAM

INCORPORATION BY REFERENCE

This application is based upon and claims the benefit of priority from Japanese patent application No. 2013-246558, filed on Nov. 28, 2013, the disclosure of which is incorporated herein in its entirety by reference.

BACKGROUND OF THE INVENTION

1. Field of the Invention

The present invention relates to an image joining apparatus, an image joining method, and an image joining program. In particular, the present invention relates to an image joining apparatus, an image joining method, and an image joining program for creating a joined image by joining a plurality of consecutive still images on a time axis, the still images constituting a moving image.

2. Description of Related Art

A technique for forming a larger image by joining a plurality of still images or by joining still images constituting a moving image is known as photomosaicing or the like.

A technique for photographing a moving image by manually moving a camera to photograph a large image and for creating a joined image by joining still images constituting the moving image has been recently achieved. Such a technique is introduced in digital cameras and the like as an additional function. In particular, the use of software for automatically or semi-automatically performing joining processing has become widespread from the time that use of digital cameras became widespread.

For example, Japanese Unexamined Patent Application Publication No. 2013-30875 discloses a technique for joining still images taken along a free camera trajectory. According to this technique, a camera moving direction during photographing is determined and still images are joined together based on the camera moving direction, thereby generating a joined image.

However, the joining of still images taken along a loop-like camera trajectory has a problem that misregistration occurs in images that should be located at the same position in the still images located at a loop start point and a loop end point. This problem occurs due to the camera trajectory and accumulation of errors in motion vectors obtained from the photographed still images.

The accumulation of errors can be reduced by using a combination of pieces of information from, for example, a high-precision direction sensor, a posture sensor, and/or an acceleration sensor. However, it is difficult to incorporate a small sensor with a sufficiently high performance into a small, lightweight, and/or inexpensive device.

Although the accumulation of errors can be reduced by repeated processing involving correction of the positions of images, the amount of calculation for repeated processing is extremely large. Accordingly, it is difficult to incorporate a circuit for achieving the repeated processing into a small, lightweight, and/or inexpensive device.

SUMMARY OF THE INVENTION

In view of the above-mentioned circumstances, an object of the present invention is to solve the problem with the misregistration of images, without the need for a high-precision sensor or the like.

A first exemplary aspect of the present invention is an image joining apparatus that creates a joined image by joining a plurality of consecutive still images on a time axis, the still images constituting a moving image, the image joining apparatus including: an image capturing unit that captures a target still image; a motion vector derivation unit that derives a motion vector between the target still image and a previous still image adjacent to the target still image on the time axis; a motion vector recording unit that records the target still image and the motion vector in such a manner that the target still image and the motion vector are associated with each other; a past image confirmation unit that confirms whether there is a past still image located before the previous still image in terms of time in at least a part of a portion to be joined to the target still image; an angle calculation unit that calculates an angle formed between a motion vector associated with the target still image and a motion vector associated with the past still image, when the past image confirmation unit has confirmed that the past still image is present in at least a part of the portion to be joined; a stop processing unit that stops joining of the target still image when the angle calculated by the angle calculation unit is equal to or greater than a predetermined angle; and a joining processing unit that joins the target still image when the past image confirmation unit has confirmed that the past still image is not present in at least a part of the portion to be joined, or when the angle calculated by the angle calculation unit is less than the predetermined angle.

A second exemplary aspect of the present invention is an image joining apparatus that creates a joined image by joining a plurality of consecutive still images on a time axis, the still images constituting a moving image, the image joining apparatus including: an image capturing unit that captures the plurality of still images; a motion vector derivation unit that derives a motion vector between a target still image and a previous still image among the plurality of still images captured by the image capturing unit, the previous still image being adjacent to the target still image on the time axis; a time recording unit that records a time of the target still image within the moving image; a past image confirmation unit that confirms whether there is a past still image located before the previous still image in terms of time in at least a part of a portion to be joined to the target still image; a time calculation unit that calculates a time difference between a time of the past still image within the moving image and a time of the target still image within the moving image, when the past image confirmation unit has confirmed that the past still image is present in at least a part of the portion to be joined; a stop processing unit that stops joining of the target still image when the time difference calculated by the time calculation unit is equal to or greater than a predetermined time difference; and a joining processing unit that joins the target still image when the past image confirmation unit has confirmed that the past still image is not present in at least a part of the portion to be joined, or when the time difference calculated by the time calculation unit is less than the predetermined time difference.

A third exemplary aspect of the present invention is an image joining method that creates a joined image by joining a plurality of consecutive still images on a time axis, the still images constituting a moving image, the image joining method including: an image capturing step of capturing a target still image; a motion vector derivation step of deriving a motion vector between the target still image and a previous still image adjacent to the target still image on the time axis; a motion vector recording step of recording the target still image and the motion vector in such a manner that the target still image and the motion vector are associated with each other; a past image confirmation step of confirming whether there is a past still image located before the previous still image in terms of time in at least a part of a portion to be joined to the target still image; an angle calculation step of calculating an angle formed between a motion vector associated with the target sill image and a motion vector associated with the past still image, when it is confirmed in the past image confirmation step that the past still image is present in at least a part of the portion to be joined; a stop processing step of stopping joining of the target still image when the angle calculated in the angle calculation step is equal to or greater than a predetermined angle; and a joining processing step of joining the target still image when it is confirmed in the past image confirmation step that the past still image is not present in at least a part of the portion to be joined, or when the angle calculated in the angle calculation step is less than the predetermined angle.

A fourth exemplary aspect of the present invention is an image joining method that creates a joined image by joining a plurality of consecutive still images on a time axis, the still images constituting a moving image, the image joining method including: an image capturing step of capturing the plurality of still images; a motion vector derivation step of deriving a motion vector between a target still image and a previous still image among the plurality of still images captured in the image capturing step, the previous still image being adjacent to the target still image on the time axis; a time recording step of recording a time of the target still image within the moving image; a past image confirmation step of confirming whether there is a past still image located before the previous still image in terms of time in at least a part of a portion to be joined to the target still image; a time calculation step of calculating a time difference between a time of the past still image within the moving image and a time of the target still image within the moving image, when it is confirmed in the past image confirmation step that the past still image is present in at least a part of the portion to be joined; a stop processing step of stopping joining of the target still image when the time difference calculated in the time calculation step is equal to or greater than a predetermined time difference; and a joining processing step of joining the target still image when it is confirmed in the past image confirmation step that the past still image is not present in at least a part of the portion to be joined, or when the time difference calculated in the time calculation step is less than the predetermined time difference.

A fifth exemplary aspect of the present invention is an image joining program that creates a joined image by joining a plurality of consecutive still images on a time axis, the still images constituting a moving image, the image joining program causing a computer to execute: an image capturing step of capturing a target still image; a motion vector derivation step of deriving a motion vector between the target still image and a previous still image adjacent to the target still image on the time axis; a motion vector recording step of recording the target still image and the motion vector in such a manner that the target still image and the motion vector are associated with each other; a past image confirmation step of confirming whether there is a past still image located before the previous till image in terms of time in at least a part of a portion to be joined to the target still image; an angle calculation step of calculating an angle formed between a motion vector associated with the target still image and a motion vector associated with the past still image, when it is confirmed in the past image confirmation step that the past still image is present in at least a part of the portion to be joined; a stop processing step of stopping joining of the target still image when the angle calculated in the angle calculation step is equal to or greater than a predetermined angle; and a joining processing step of joining the target still image when it is confirmed in the past image confirmation step that the past still image is not present in at least a part of the portion to be joined, or when the angle calculated in the angle calculation step is less than the predetermined angle.

A sixth exemplary aspect of the present invention is an image joining program that creates a joined image by joining a plurality of consecutive still images on a time axis, the still images constituting a moving image, the image joining program causing a computer to execute: an image capturing step of capturing the plurality of still images; a motion vector derivation step of deriving a motion vector between a target still image and a previous still image among the plurality of still images captured in the image capturing step, the previous still image being adjacent to the target still image on the time axis; a time recording step of recording a time of the target still image within the moving image; a past image confirmation step of confirming whether there is a past sill image located before the previous still image in terms of time in at least a part of a portion to be joined to the target still image; a time calculation step of calculating a time difference between a time of the past still image within the moving image and a time of the target still image within the moving image, when it is confirmed in the past image confirmation step that the past still image is present in at least a part of the portion to be joined; a stop processing step of stopping joining of the target still image when the time difference calculated in the time calculation step is equal to or greater than a predetermined time difference; and a joining processing step of joining the target still image when it is confirmed in the past image confirmation step that the past still image is not present in at least a part of the portion to be joined, or when the time difference calculated in the time calculation step is less than the predetermined time difference.

According to the present invention, joining of a target still image is stopped under a predetermined condition, thereby making the misregistration of joined images inconspicuous, without the need for a high-precision sensor or the like.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

An image joining apparatus according to a first exemplary embodiment of the present invention will be described with reference to FIGS. 1 to 4B.

Figure 1:
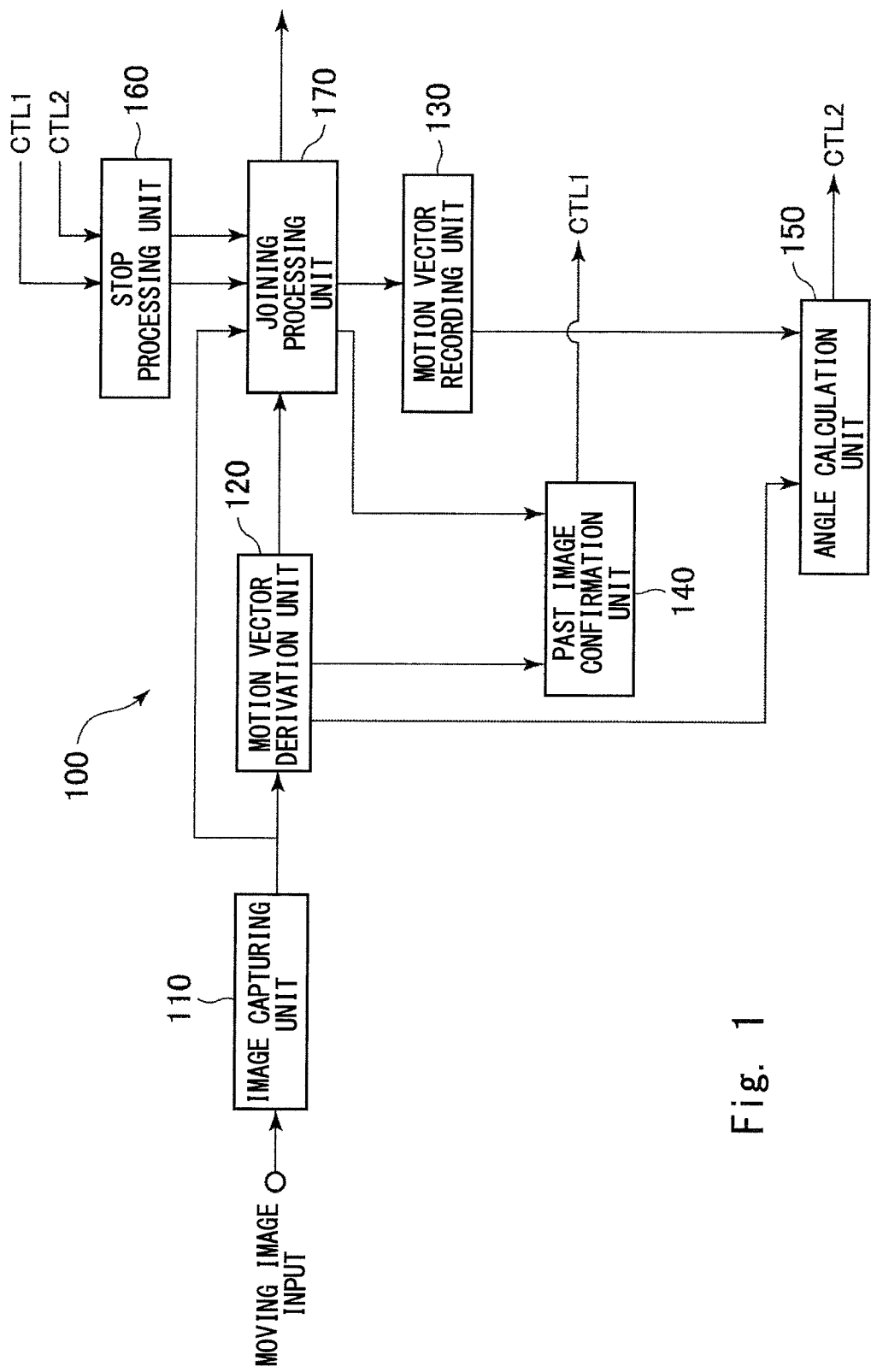
FIG. 1 is a block diagram illustrating an image joining apparatus according to a first exemplary embodiment of the present invention.

The image joining apparatus according to the first exemplary embodiment of the present invention is an image joining apparatus 100 which creates a joined image by joining a plurality of consecutive still images on a time axis. The still images constitute a moving image. As shown in FIG. 1, the image joining apparatus 100 includes an image capturing unit 110, a motion vector derivation unit 120, a motion vector recording unit 130, a past image confirmation unit 140, an angle calculation unit 150, a stop processing unit 160, and a joining processing unit 170.

As the above-mentioned moving image, a moving image recorded in a recording medium, a moving image picked up by an image pickup apparatus in real time, and/or a moving image captured via a network through a communication device in real time may be used. As the recording medium, a hard disk and/or a non-volatile memory, for example, may be used. The image pickup apparatus is capable of photographing while changing an image pickup direction. Examples of the image pickup apparatus may include a camcorder, a camera attached to a mobile phone, and an endoscope. The image joining apparatus 100 may further include an image pickup apparatus, a recording medium, and/or a communication device as mentioned above.

Figure 2:
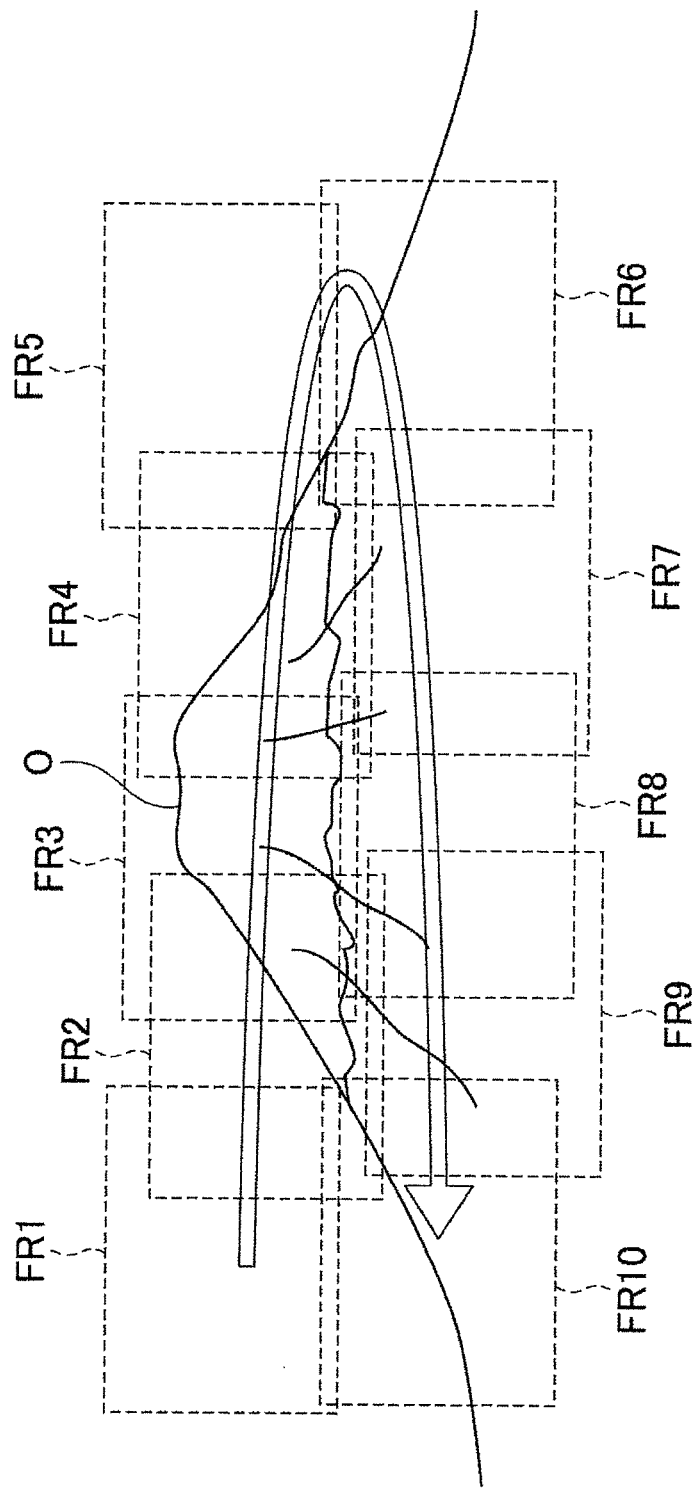
FIG. 2 is a schematic view showing still images captured in the image joining apparatus according to the first exemplary embodiment of the present invention.

The image capturing unit 110 captures target still images. FIG. 2 is a schematic view showing still images captured by the image capturing unit 110. Still images to be joined together, such as still images FR1 to FR10, can constitute a moving image that is picked up by drawing a free trajectory with respect to an imaging object O. In the following example, the still images FR1 to FR10 are picked up sequentially on the time axis in order from the still image FR1 to the still image FR10. The following example illustrates that the image joining apparatus 100 joins all areas of the still images FR1 to FR10, but only areas of interest, which are a part of the still images, may be joined together.

Figure 3:
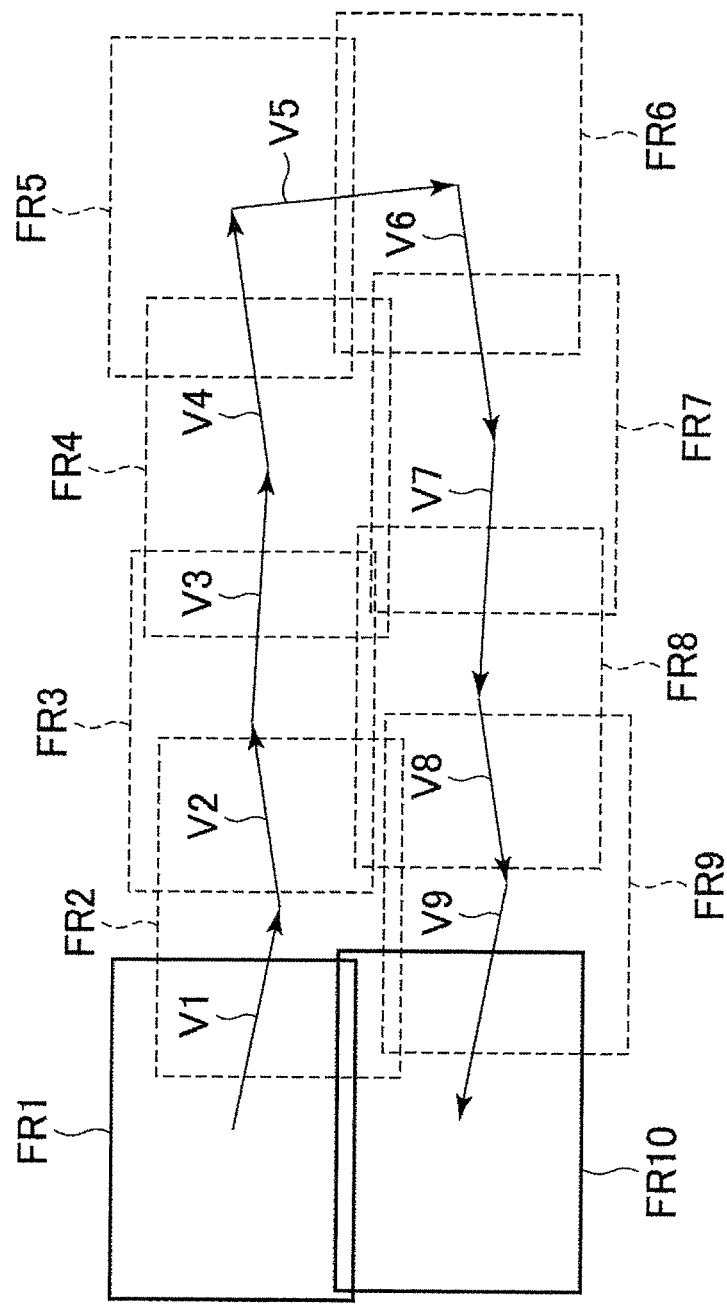
FIG. 3 is a diagram illustrating processing performed by a motion vector derivation unit in the image joining apparatus according to the first exemplary embodiment of the present invention.

As shown in FIG. 3, the motion vector derivation unit 120 derives a motion vector between a target still image and a previous still image adjacent to the target still image on the time axis. For example, when the target still image is FR2, the motion vector derivation unit 120 can derive a motion vector from the previous still image FR1 to the target still image FR2 on the time axis. The previous still image FR1 is adjacent to the target still image FR2 on the time axis. The motion vector derivation unit 120 can detect similar areas of the images by, for example, a template matching method, and can derive a motion vector from the moving distance and moving direction of the similar areas.

The motion vector recording unit 130 records the target still image and the motion vector in such a manner that the target still image and the motion vector are associated with each other. The motion vector recording unit 130 may record the correspondence between all target still images and respective motion vectors, or may record the correspondence between only the target still images joined together and respective motion vectors. Assuming that the target still image is the still image FR2, for example, the motion vector recording unit 130 can record, in a manner associated with each other, the still image FR2 and a motion vector V1 from the previous still image FR1 to the still image FR2 on the time axis. Examples of the motion vector recording unit 130 may include a recording medium such as a hard disk and/or a non-volatile memory.

The past image confirmation unit 140 confirms whether there is a past still image located before the previous still image in terms of time in at least a part of a portion to be joined to the target still image. The joined previous still image can be recorded in the form of "0" or "1" indicating the presence or absence of the past still image corresponding to the portion to be joined. The past image confirmation unit 140 confirms the value of "0" or "1" for the entire range of the portion to be joined, thereby making it possible to confirm the presence of a past still image. Specifically, assuming that the target still image is the still image FR8, the past image confirmation unit 140 can confirm that the still images FR2 to FR4, which are past still images located before the previous still image FR7 in terms of time, are present in at least a part of the portion to be joined to the target still image FR8. The past image confirmation unit 140 outputs a signal CTL1, which indicates a confirmation result, to the stop processing unit 160.

Figure 4A:
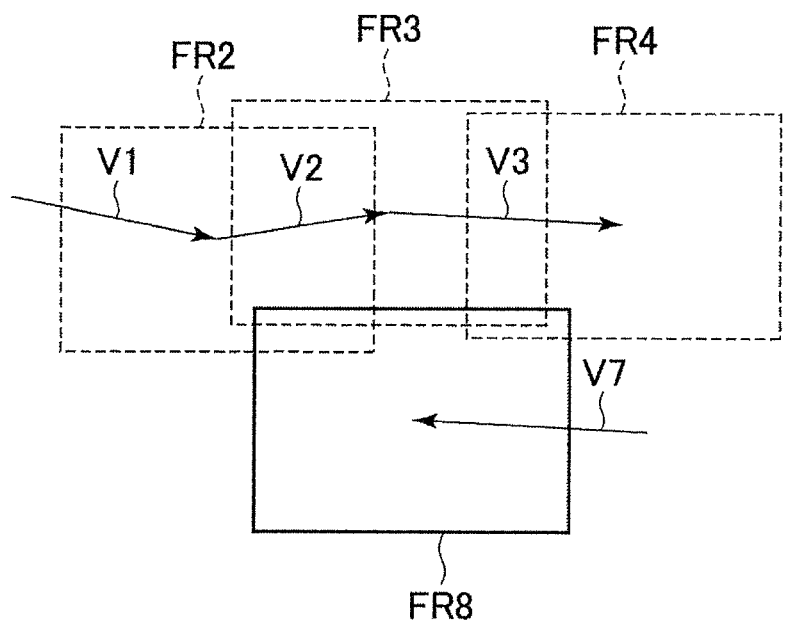
FIG. 4A is a diagram illustrating processing performed by an angle calculation unit in the image joining apparatus according to the first exemplary embodiment of the present invention.
Figure 4B:
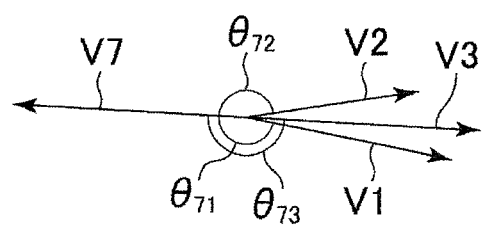
FIG. 4B is a diagram illustrating processing performed by the angle calculation unit in the image joining apparatus according to the first exemplary embodiment of the present invention.

When the past image confirmation unit 140 has confirmed that the past still image is present in a part of the portion to be joined, the angle calculation unit 150 calculates an angle formed between the motion vector associated with the target still image and the motion vector associated with the past still image. Specifically, assuming that the target still image is the still image FR8, the angle calculation unit 150 can calculate angles $\theta_{71}$, $\theta_{72}$, and $\theta_{73}$ which are respectively formed between motion vectors V1 to V3, which are respectively associated with the past still images FRs 2 to 4, and a motion vector V7 which is associated with the still image FR8, as shown in FIGS. 4A and 4B. The angle calculation unit 150 can calculate the angles formed between the vectors based on the inner product between the vectors. The angle calculation unit 150 outputs a signal CTL2, which indicates the calculated angles, to the stop processing unit 160.

When the angles calculated by the angle calculation unit 150 are equal to or greater than a predetermined angle, the stop processing unit 160 stops joining of the target still image. The predetermined angle is an angle representing a reciprocating motion in a loop-like imaging trajectory. The predetermined angle is, for example, 120°.

The joining processing unit 170 joins the target still image when the past image confirmation unit 140 has confirmed that there is no past still image in a part of the portion to be joined, or when the angles calculated by the angle calculation unit 150 are less than the predetermined angle.

According to the image joining apparatus 100 of the present invention described above, joining of the target still image is stopped under a predetermined condition, thereby making the misregistration of joined images inconspicuous, without the need for a high-precision sensor or the like.

When the stop processing unit 160 stops joining of the target still image, the image joining apparatus 100 can continue the joining process by using, as a new target still image, a subsequent still image adjacent to the target still image on the time axis. Specifically, referring to FIG. 3, when joining of the still image FR8 is stopped, the joining process can be continued by using the still image FR9 as a new target still image, so that a joined image can be created. With this configuration, the misregistration due to the accumulation of errors in motion vectors can be made inconspicuous.

When the stop processing unit 160 stops joining of the target still image, the image joining apparatus 100 can create a joined image by using the previous still image as a final image. Specifically, referring to FIG. 3, when joining of the still image FR8 is stopped, the joined image can be created by using the still image FR7 as a final image. With this configuration, the process can be interrupted before the misregistration of images due to the accumulation of errors in motion vectors occurs.

When the stop processing unit 160 stops joining of the target still image, the image joining apparatus 100 can create a first joined image by using the previous still image as a final image, and can continue the joining process by using, as a new target still image, a subsequent still image adjacent to the target still image on the time axis. Specifically, referring to FIG. 3, when joining of the still image FR8 is stopped, a joined image can be temporarily created by using the still image FR7 as a final image, and the joining process can be continued by using the still image FR9 as a new target still image. This configuration makes it possible to create a plurality of joined images in a matched area, while preventing joining of images in which misregistration occurs due to the accumulation of errors in motion vectors.

Next, an exemplary image joining method according to the first exemplary embodiment of the present invention will be described.

Figure 5:
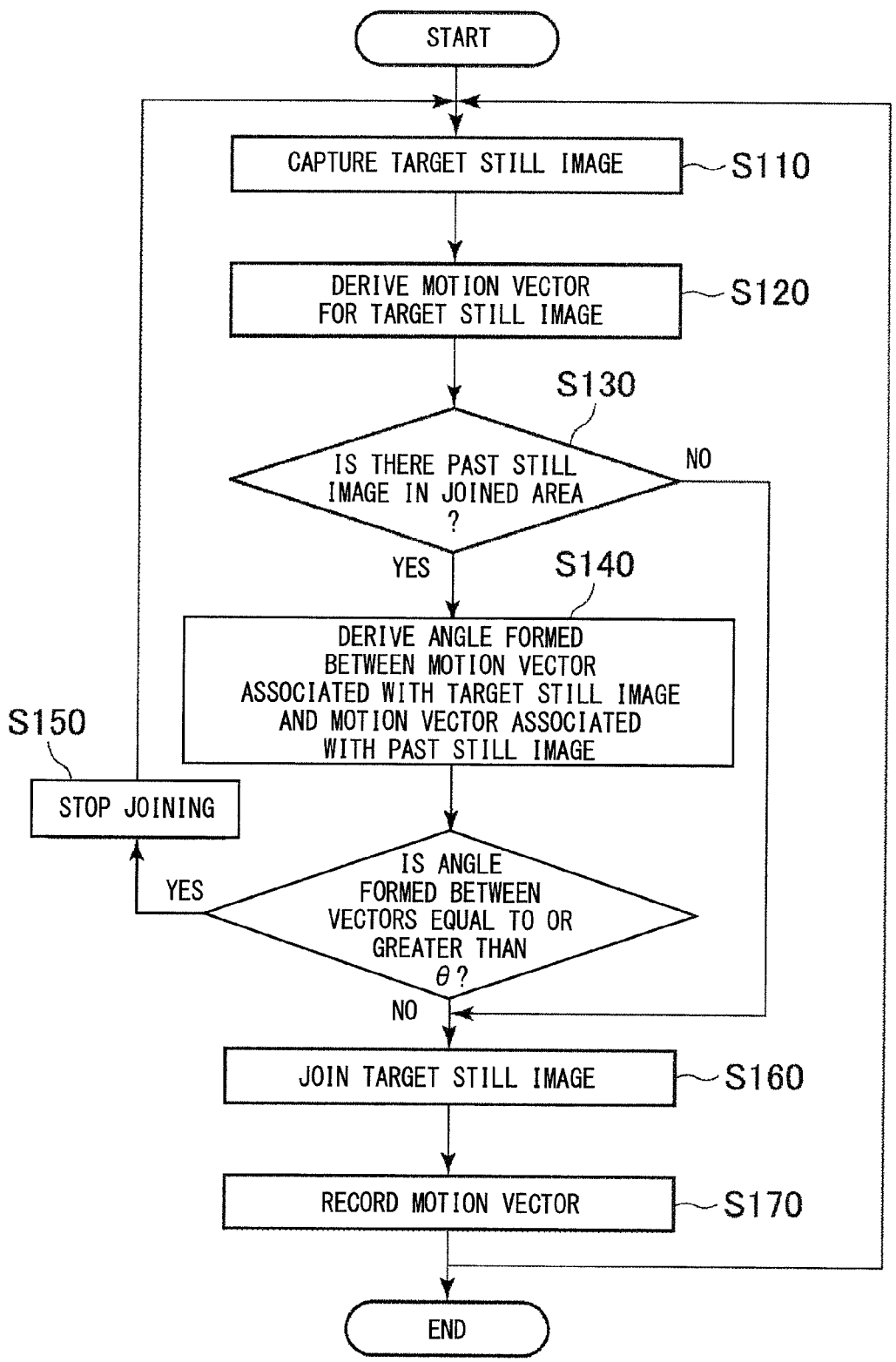
FIG. 5 is a flowchart illustrating a flow of processing of an image joining method according to the first exemplary embodiment of the present invention.

The image joining method according to the first exemplary embodiment is an image joining method that creates a joined image by joining a plurality of consecutive still images on a time axis as shown in FIG. 5. The still images constitute a moving image. The image joining method includes an image capturing step (S110), a motion vector derivation step (S120), a past image confirmation step (S130), an angle calculation step (S140), a stop processing step (S150), a joining processing step (S160), and a motion vector recording step (S170).

In the image capturing step (S110), a target still image is captured. This step can be processed by the image capturing unit 110 described above.

In the motion vector derivation step (S120), a motion vector between the target still image and a previous still image adjacent to the target still image on the time axis is derived. This step can be processed by the motion vector derivation unit 120 described above.

In the past image confirmation step (S130), it is confirmed whether there is a past still image located before the previous still image in terms of time in at least a part of a portion to be joined to the target still image. This step can be processed by the past image confirmation unit 140 described above.

In the angle calculation step (S140), when it is confirmed in the past image confirmation step (S130) that there is a past still image in a part of the portion to be joined (YES in S130), an angle formed between the motion vector associated with the target still image and the motion vector associated with the past still image is calculated. This step can be processed by the angle calculation unit 150 described above.

In the stop processing step (S150), joining of the target still image is stopped when the angle calculated in the angle calculation step (S140) is equal to or greater than the predetermined angle. This step can be processed by the stop processing unit 160 described above.

In the joining processing step (S160), the target still image is joined when it is confirmed in the past image confirmation step (S130) that there is no past still image in a part of the portion to be joined (NO in S130), or when the angle calculated in the angle calculation step (S140) is less than the predetermined angle. This step can be processed by the joining processing unit 170 described above.

In the motion vector recording step (S170), the target still image and the motion vector are recorded in a manner associated with each other. This step can be processed by the motion vector recording unit 130 described above.

Next, an exemplary image joining program according to the first exemplary embodiment of the present invention will be described.

The image joining program according to the first exemplary embodiment is an image joining program that creates a joined image by joining a plurality of consecutive still images on the time axis. The still images constitute a moving image. The image joining program causes a computer to execute an image capturing function, a motion vector derivation function, a motion vector recording function, a past image confirmation function, an angle calculation function, a stop processing function, and a joining processing function.

The image capturing function captures a target still image. This function can be implemented by the image capturing unit 110 described above.

The motion vector derivation function derives a motion vector between the target still image and a previous still image adjacent to the target still image on the time axis. This function can be implemented by the motion vector derivation unit 120 described above.

The motion vector recording function records the target still image and the motion vector in such a manner that they are associated with each other. This function can be implemented by the motion vector recording unit 130 described above.

The past image confirmation function confirms whether there is a past still image located before the previous still image in terms of time in at least a part of a portion to be joined to the target still image. This function can be implemented by the past image confirmation unit 140 described above.

When it is confirmed, by the past image confirmation function, that there is a past still image in a part of the portion to be joined, the angle calculation function calculates an angle formed between the motion vector associated with the target still image and the motion vector associated with the past still image. This function can be implemented by the angle calculation unit 150 described above.

When the angle calculated by the angle calculation function is equal to or greater than the predetermined angle, the stop processing function stops joining of the target still image. This function can be implemented by the stop processing unit 160 described above.

The joining processing function joins the target still image when it is confirmed, by the past image confirmation function, that there is no past still image in a part of the portion to be joined, or when the angle calculated by the angle calculation function is less than the predetermined angle. This function can be implemented by the joining processing unit 170 described above.

The program can be stored and provided in a computer-readable recording medium. The recording medium is not particularly limited as long as it is a computer-readable medium, such as a CD-ROM or a DVD.

Second Exemplary Embodiment

An image joining apparatus according to a second exemplary embodiment of the present invention will be described with reference to FIGS. 6, 7A, and 7B.

Figure 6:
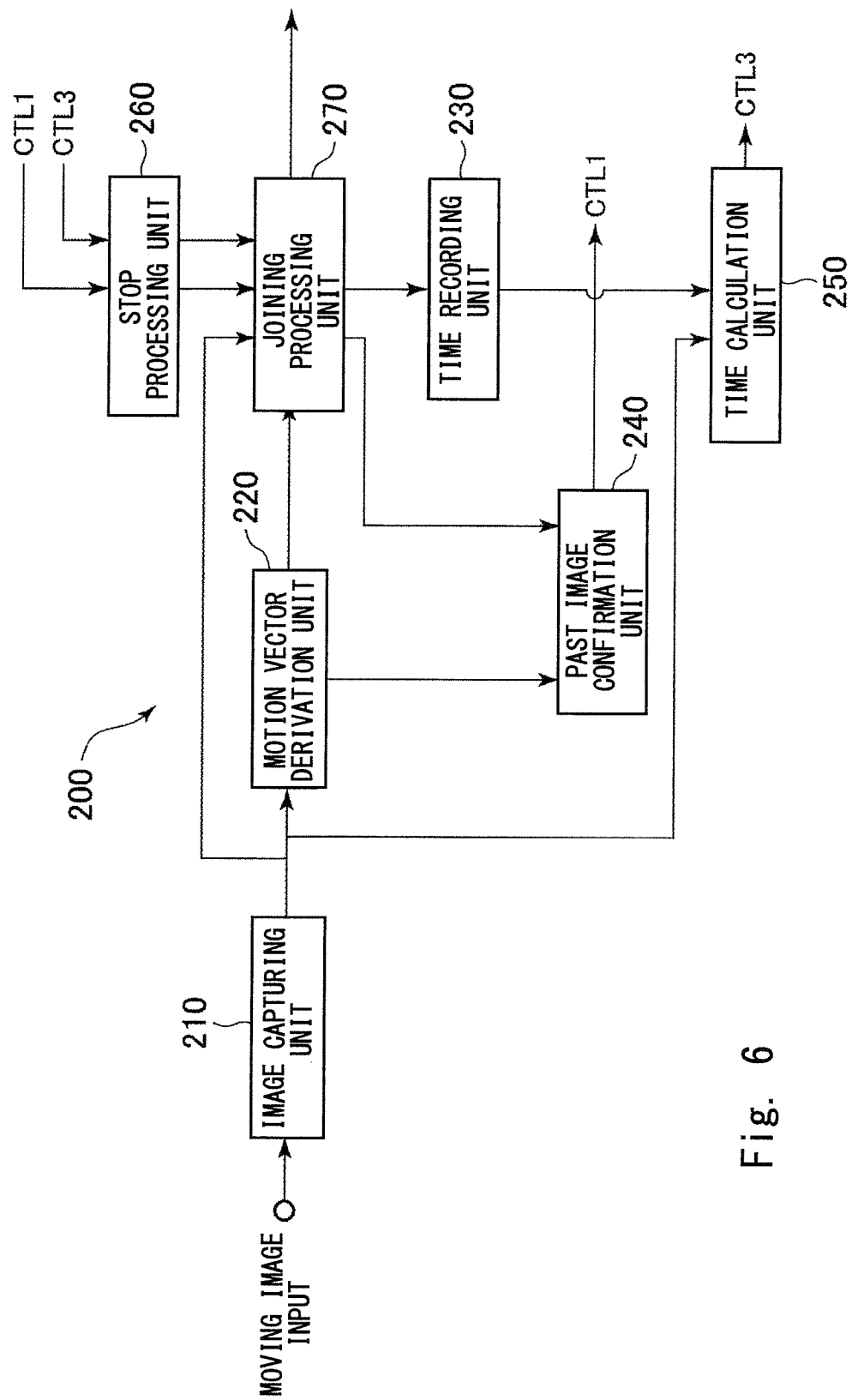
FIG. 6 is a block diagram illustrating an image joining apparatus according to a second exemplary embodiment of the present invention.
Figure 7A:
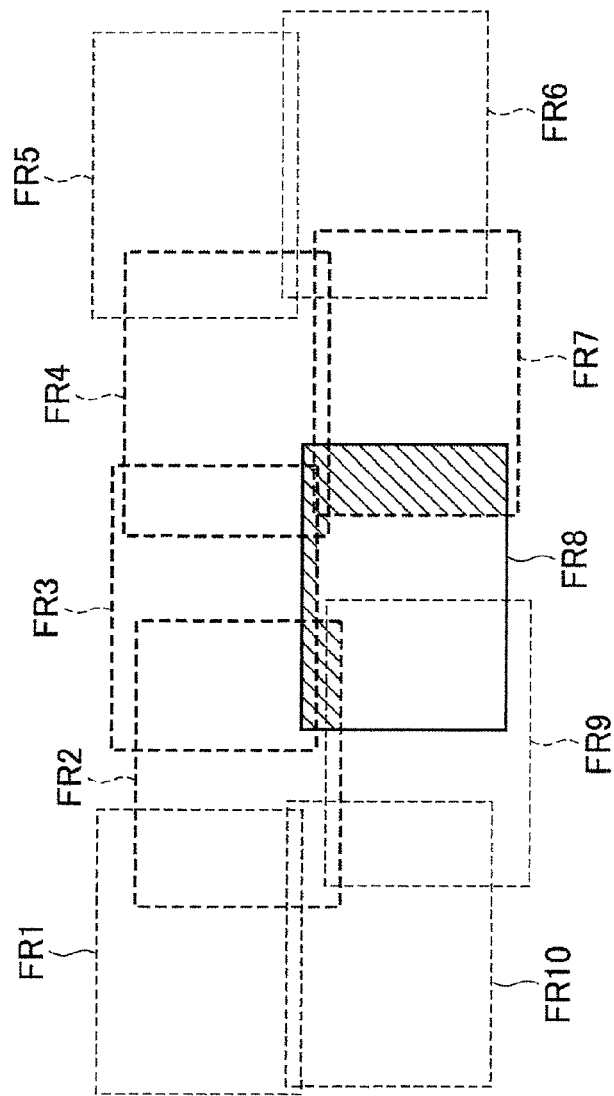
FIG. 7A is a diagram illustrating processing performed by a time calculation unit in the image joining apparatus according to the second exemplary embodiment of the present invention.
Figure 7B:
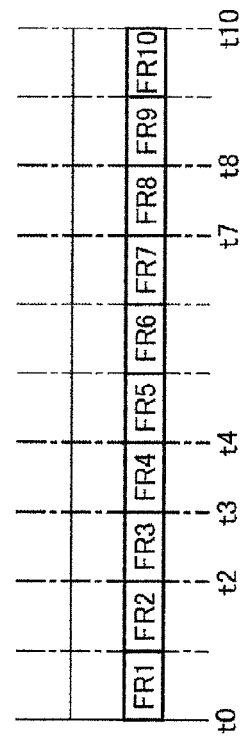
FIG. 7B is a diagram illustrating processing performed by the time calculation unit in the image joining apparatus according to the second exemplary embodiment of the present invention.

The image joining apparatus according to the secondary exemplary embodiment of the present invention is an image joining apparatus 200 that creates a joined image by joining a plurality of consecutive still images on a time axis as shown in FIG. 6. The still images constitute a moving image. The image joining apparatus 200 includes an image capturing unit 210, a motion vector derivation unit 220, a time recording unit 230, a past image confirmation unit 240, a time calculation unit 250, a stop processing unit 260, and a joining processing unit 270.

The image capturing unit 210 captures a target still image. This image capturing unit 210 may have the same configuration as that of the image capturing unit 110 described above.

The motion vector derivation unit 220 derives a motion vector between the target still image and a previous still image adjacent to the target still image on the time axis. This motion vector derivation unit 220 may have the same configuration as that of the motion vector derivation unit 120 described above.

The time recording unit 230 records the time of the target still image within the moving image. As shown in FIG. 7A, assuming that the target still image is the still image FR3, for example, the time recording unit 230 records a time t3 within the moving image of the still image FR3. The time recording unit 230 may record the time of all target still images within the moving image, or may record the time of only the target still images joined together within the moving image. When it is possible to refer to the time intervals between the still images constituting the moving image, the time recording unit 230 may record the number of still images ranging from a moving image start point to the target still image. When the still images constituting the moving image are recorded at a constant time interval, the time recording unit 230 records the constant time interval and the number of still images ranging from the moving image start point to the target still image, thereby making it possible to record the time of the target still image within the moving image. The time recording unit 230 is, for example, a recording medium such as a hard disk and/or a non-volatile memory.

The past image confirmation unit 240 confirms whether there is a past still image located before the previous still image in terms of time in at least a part of a portion to be joined to the target still image. This past image confirmation unit 240 may have the same configuration as that of the past image confirmation unit 140 described above.

When the past image confirmation unit 240 has confirmed that the past still image is present in a part of the portion to be joined, the time calculation unit 250 calculates a time difference between the time of the past still image within the moving image and the time of the target still image within the moving image. As shown in FIG. 7B, assuming that the target still image is the still image FR8, the time calculation unit 250 can calculate a time difference between a time t4 of the previous still image FR4 within the moving image and a time t8 of the still image FR8 within the moving image. For example, when the frame rate representing the number of still images per second is 30 fps, and when the difference in the number of frames, which is the difference in the number of still images between the target still image and the past still image, is 120, the time calculation unit 25 can derive a time difference of four seconds. The time calculation unit 250 outputs a signal CTL3, which indicates the time difference, to the stop processing unit 260.

When the time difference calculated by the time calculation unit 250 is equal to or greater than a predetermined time difference, the stop processing unit 260 stops joining of the target still image. The predetermined time difference is set within the range in which the number of accumulated errors in the alignment does not increase. The predetermined time difference is, for example, 10 seconds.

The joining processing unit 270 joins the target still image when the past image confirmation unit 240 has confirmed that there is no past still image in a part of the portion to be joined, or when the time difference calculated by the time calculation unit 250 is less than the predetermined time difference.

According to the image joining apparatus 200 of the present invention described above, joining of the target still image is stopped under a predetermined condition, thereby making the misregistration of joined images inconspicuous, without the need for a high-precision sensor or the like.

Next, an exemplary image joining method according to the second exemplary embodiment of the present invention will be described.

Figure 8:
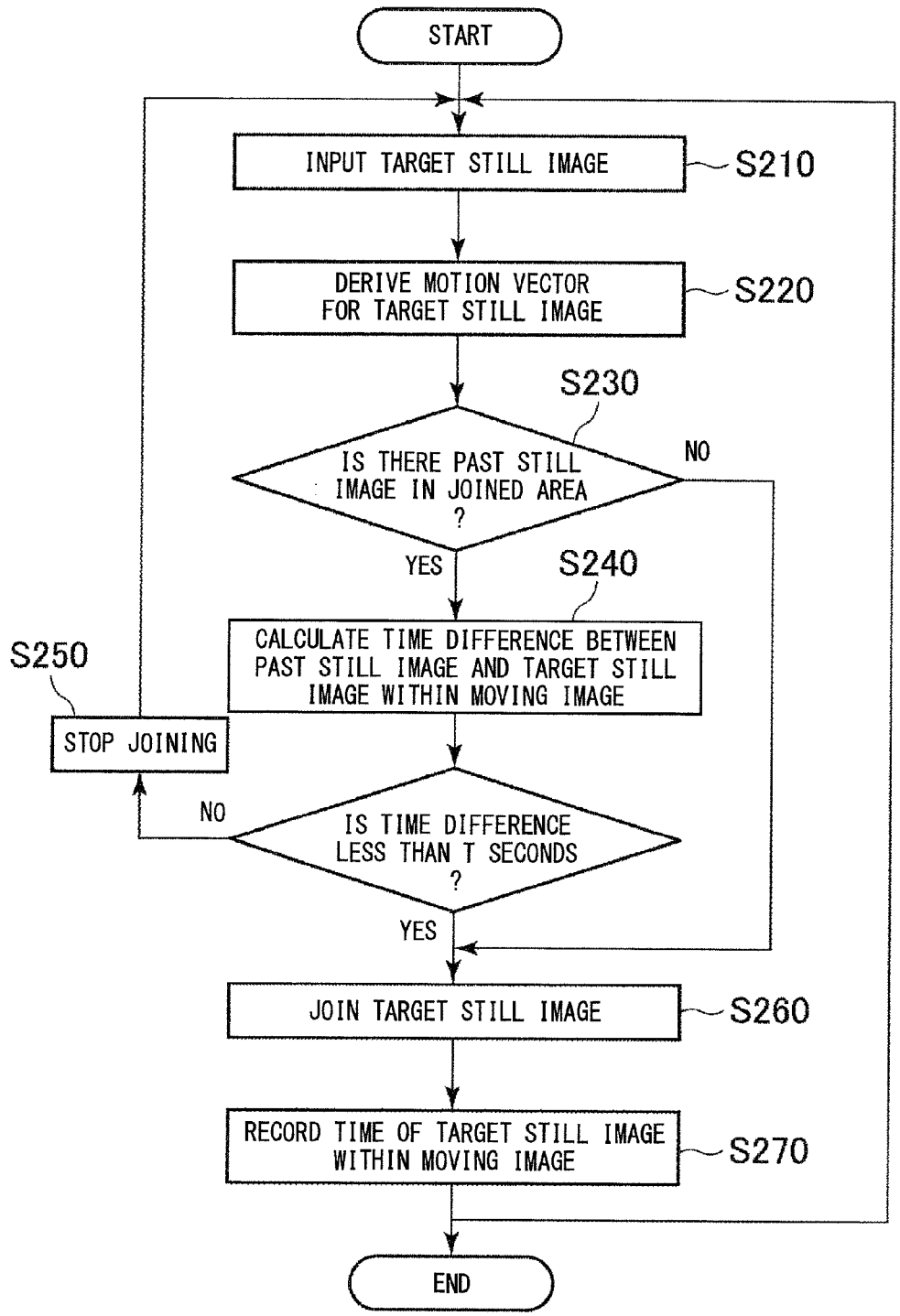
FIG. 8 is a flowchart illustrating a flow of processing of an image joining method according to the second exemplary embodiment of the present invention.

The image joining method according to the second exemplary embodiment is an image joining method that creates a joined image by joining a plurality of consecutive still images on a time axis as shown in FIG. 8. The still images constitute a moving image. The image joining method includes an image capturing step (S210), a motion vector derivation step (S220), a past image confirmation step (S230), a time calculation step (S240), a stop processing step (S250), a joining processing step (S260), and a time recording step (S270).

In the image capturing step (S210), a target still image is captured. This step can be processed by the image capturing unit 210 described above.

In the motion vector derivation step (S220), a motion vector between the target still image and a previous still image adjacent to the target still image on the time axis is derived. This step can be processed by the motion vector derivation unit 220 described above.

In the past image confirmation step (S230), it is confirmed whether there is a past still image located before the previous still image in terms of time in at least a part of a portion to be joined to the target still image. This step can be processed by the past image confirmation unit 240 described above.

In the time calculation step (S240), when it is confirmed in the past image confirmation step (S230) that there is a past still image in a part of the portion to be joined (YES in S230), a time difference between the time of the past still image within the moving image and the time of the target still image within the moving image is calculated. This step can be processed by the time calculation unit 250 described above.

In the stop processing step (S250), joining of the target still image is stopped when the time difference calculated in the time calculation step (S240) is equal to or greater than the predetermined time difference. This step can be processed by the stop processing unit 260 described above.

In the joining processing step (S260), the target still image is joined when it is confirmed in the past image confirmation step (S230) that there is no past still image in a part of the portion to be joined (NO in S230), or when the time difference calculated in the time calculation step (S240) is less than the predetermined time difference. This step can be processed by the joining processing unit 270 described above.

In the time recording step (S270), the time of the target still image within the moving image is recorded. This step can be processed by the time recording unit 230 described above.

Next, an exemplary image joining program according to the second exemplary embodiment of the present invention will be described.

The image joining program according to the second exemplary embodiment is an image joining program that creates a joined image by joining a plurality of consecutive still images on the time axis. The still images constitute a moving image. The image joining program causes a computer to execute an image capturing function, a motion vector derivation function, a time recording function, a past image confirmation function, a time calculation function, a stop processing function, and a joining processing function.

The image capturing function captures a target still image. This function can be implemented by the image capturing unit 210 described above.

The motion vector derivation function derives a motion vector between the target still image and a previous still image adjacent to the target still image on the time axis. This function can be implemented by the motion vector derivation unit 220 described above.

The time recording function records the time of the target still image within the moving image. This function can be implemented by the time recording unit 230 described above.

The past image confirmation function confirms whether there is a past still image located before the previous still image in terms of time in at least a part of a portion to be joined to the target still image. This function can be implemented by the past image confirmation unit 240 described above.

When it is confirmed, by the past image confirmation function, that there is a past still image in a part of the portion to be joined, the time calculation function calculates a time difference between the time of the past still image within the moving image and the time of the target sill image within the moving image. This function can be implemented by the angle calculation unit 250 described above.

When the time difference calculated by the time calculation function is equal to or greater than the predetermined time difference, the stop processing function stops joining of the target still image. This function can be implemented by the stop processing unit 260 described above.

The joining processing function joins the target still image when it is confirmed, by the past image confirmation function, that there is no past still image in a part of the portion to be joined, or when the time difference calculated by the time calculation function is less than the predetermined time difference. This function can be implemented by the joining processing unit 270 described above.

The program can be stored and provided in a computer-readable recording medium. The recording medium is not particularly limited as long as it is a computer-readable medium, such as a CD-ROM or a DVD.

Figure 9:
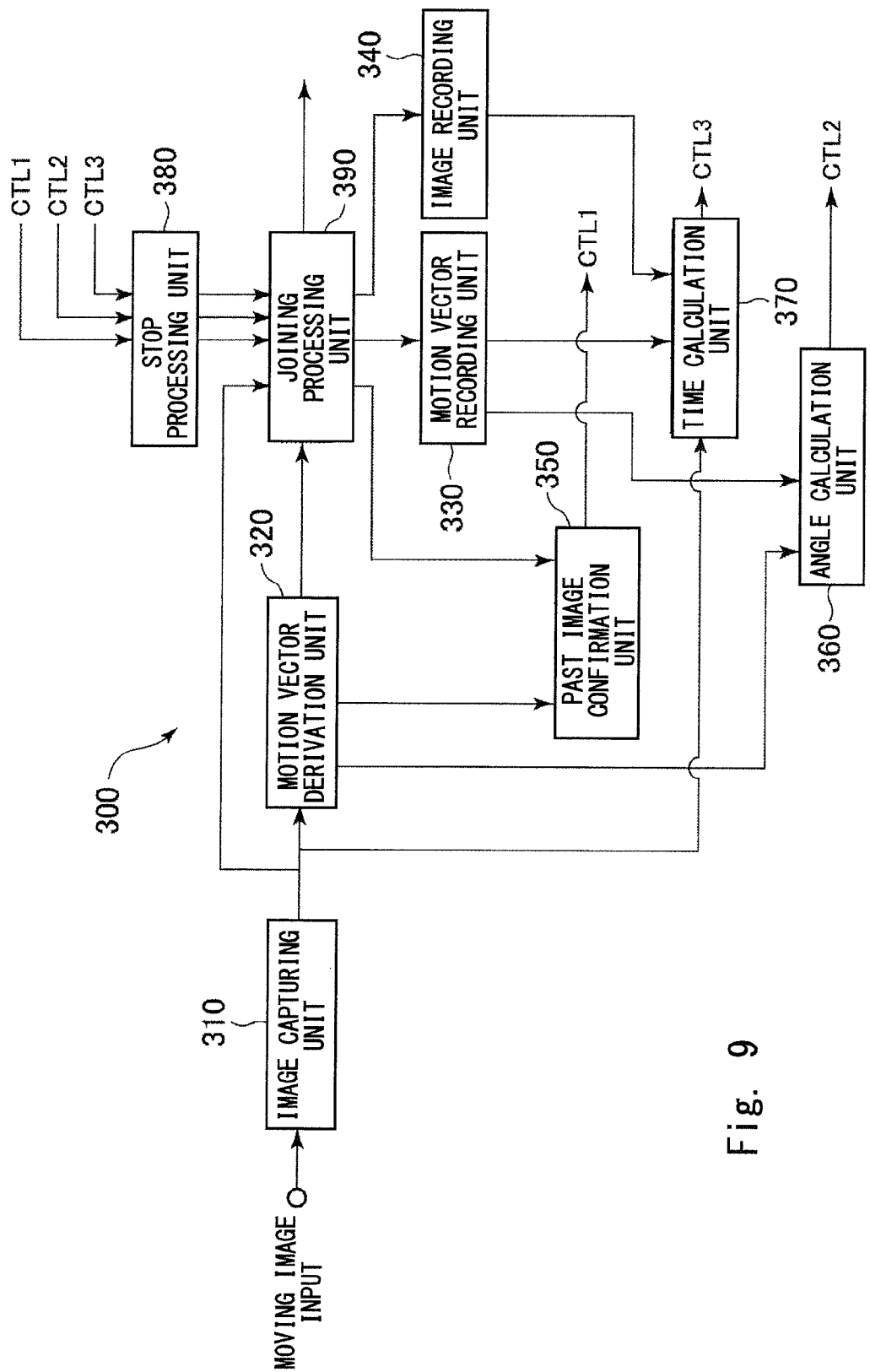
FIG. 9 is a block diagram illustrating an image joining apparatus according to another exemplary embodiments of the present invention.

The image joining apparatus of the present invention can be implemented as other exemplary embodiments by combining the first exemplary embodiment and the second exemplary embodiment. Specifically, an image joining apparatus 300 shown in FIG. 9 creates a joined image by joining a plurality of consecutive still images on the time axis. The still images constitute a moving image. The image joining apparatus 300 includes an image capturing unit 310, a motion vector derivation unit 320, a motion vector recording unit 330, a time recording unit 340, a past image confirmation unit 350, an angle calculation unit 360, a time calculation unit 370, a stop processing unit 380, and a joining processing unit 390.

When the angle calculated by the angle calculation unit 360 is equal to or greater than a predetermined angle, and/or when the time difference calculated by the time calculation unit 370 is equal to or greater than a predetermined time difference, the stop processing unit 380 stops joining of the target still image.

The joining processing unit 390 joins the target still image when the past image confirmation unit 350 has confirmed that there is no past still image in a part of the portion to be joined, or when the angle calculated by the angle calculation unit 360 is less than the predetermined angle, or when the time difference calculated by the time calculation unit 370 is less than the predetermined time difference.

The other components and functions of these other exemplary embodiments may be the same as those of the first and second exemplary embodiments.

According to the image joining apparatus 300 of the present invention described above, joining of the target still image is stopped under a predetermined condition, thereby making the misregistration of joined images inconspicuous, without the need for a high-precision sensor or the like.

According to the image joining apparatus, the image joining method, and the image joining program of the present invention, joining of the target still image is stopped under a predetermined condition, thereby making the misregistration of joined images inconspicuous, without the need for a high-precision sensor or the like.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The image joining apparatus, the image joining method, and the image joining program according to the present invention have been described in detail above. However, the present invention is not limited to the above-described exemplary embodiments, and can be modified or changed in various manners without departing from the gist of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image joining apparatus that creates a joined image by joining a plurality of consecutive still images on a time axis, the still images constituting a moving image, the image joining apparatus comprising:
    an image sensor that captures the plurality of still images; and
    at least one processor that performs an image joining method by executing a computer program,
    the image joining method comprising:
        a motion vector derivation step of deriving a motion vector between a target still image and a previous still image among the plurality of still images captured by the image sensor, the previous still image being adjacent to the target still image on the time axis;
        a time recording step of recording a time of the target still image within the moving image;
        a past image confirmation step of confirming whether there is a past still image located before the previous still image in terms of time in at least a part of a portion to be joined to the target still image;
        a time calculation step of calculating a time difference between a time of the past still image within the moving image and a time of the target still image within the moving image, when it is confirmed in the past image confirmation step that the past still image is present in at least a part of the portion to be joined;
        a stop processing step of stopping joining of the target still image when the time difference calculated in the time calculation step is equal to or greater than a predetermined time difference; and
        a joining processing step of joining the target still image when it is confirmed in the past image confirmation step that the past still image is not present in at least a part of the portion to be joined, or when the time difference calculated in the time calculation step is less than the predetermined time difference.

2. The image joining apparatus according to claim 1, wherein when stopping joining of the target still image in the stop processing step, the image joining apparatus continues joining processing by using, as a new target still image, a subsequent still image adjacent to the target still image on the time axis.

3. The image joining apparatus according to claim 1, wherein when stopping joining of the target still image in the stop processing steps, the image joining apparatus creates the joined image by using the previous still image as a final image.

4. The image joining apparatus according to claim 1, when stopping joining of the target still image in the stop processing steps, the image joining apparatus creates a first joined image by using the previous still image as a final image, and continues joining processing by using, as a new target still image, a subsequent still image adjacent to the target still image on the time axis.

5. An image joining method that creates a joined image by joining a plurality of consecutive still images on a time axis, the still images constituting a moving image, the image joining method comprising:
    an image capturing step of capturing the plurality of still images;
    a motion vector derivation step of deriving a motion vector between a target still image and a previous still image among the plurality of still images captured in the image capturing step, the previous still image being adjacent to the target still image on the time axis;
    a time recording step of recording a time of the target still image within the moving image;
    a past image confirmation step of confirming whether there is a past still image located before the previous still image in terms of time in at least a part of a portion to be joined to the target still image;
    a time calculation step of calculating a time difference between a time of the past still image within the moving image and a time of the target still image within the moving image, when it is confirmed in the past image confirmation step that the past still image is present in at least a part of the portion to be joined;
    a stop processing step of stopping joining of the target still image when the time difference calculated in the time calculation step is equal to or greater than a predetermined time difference; and
    a joining processing step of joining the target still image when it is confirmed in the past image confirmation step that the past still image is not present in at least a part of the portion to be joined, or when the time difference calculated in the time calculation step is less than the predetermined time difference.

6. The image joining method according to claim 5, wherein when joining of the target still image is stopped in the stop processing step, joining processing is continued by using, as a new target still image, a subsequent still image adjacent to the target still image on the time axis.

7. The image joining method according to claim 5, wherein when joining of the target still image is stopped in the stop processing step, the joined image is created by using the previous still image as a final image.

8. The image joining method according to claim 5, wherein when joining of the target still image is stopped in the stop processing step, a first joined image is created by using the previous still image as a final image, and joining processing is continued by using, as a new target still image, a subsequent still image adjacent to the target still image on the time axis.

9. A non-transitory computer readable medium storing an image joining program that creates a joined image by joining a plurality of consecutive still images on a time axis, the still images constituting a moving image, the image joining program causing a computer to execute:
    an image capturing step of capturing the plurality of still images;
    a motion vector derivation step of deriving a motion vector between a target still image and a previous still image among the plurality of still images captured in the image capturing step, the previous still image being adjacent to the target still image on the time axis;

a time recording step of recording a time of the target still image within the moving image;

a past image confirmation step of confirming whether there is a past sill image located before the previous still image in terms of time in at least a part of a portion to be joined to the target still image;

a time calculation step of calculating a time difference between a time of the past still image within the moving image and a time of the target still image within the moving image, when it is confirmed in the past image confirmation step that the past still image is present in at least a part of the portion to be joined;

a stop processing step of stopping joining of the target still image when the time difference calculated in the time calculation step is equal to or greater than a predetermined time difference; and a joining processing step of joining the target still image when it is confirmed in the past image confirmation step that the past still image is not present in at least a part of the portion to be joined, or when the time difference calculated in the time calculation step is less than the predetermined time difference.

* * * * *